United States Patent
Atkinson, Jr.

(10) Patent No.: US 6,651,783 B1
(45) Date of Patent: Nov. 25, 2003

(54) ADJUSTABLE MOUNTING ASSEMBLY FOR A RAPIDLY-DEPLOYABLE ICE CHAIN SYSTEM FOR WHEELED VEHICLES

(76) Inventor: John H. Atkinson, Jr., 306 S. 1680 West, Provo, UT (US) 84601

( * ) Notice: Subject to any disclaimer, the term of this patent is extended or adjusted under 35 U.S.C. 154(b) by 0 days.

(21) Appl. No.: 10/070,336
(22) PCT Filed: Aug. 28, 2000
(86) PCT No.: PCT/US00/23576
§ 371 (c)(1), (2), (4) Date: Feb. 27, 2002
(87) PCT Pub. No.: WO01/15947
PCT Pub. Date: Mar. 8, 2001
(51) Int. Cl.[7] ................................................. B60T 1/00
(52) U.S. Cl. ........................ 188/4 B; 301/6 R; 280/757
(58) Field of Search .............................. 301/6 R, 41 R, 301/42; 188/4 B; 152/214, 216, 221, 222; 280/757

(56) References Cited

U.S. PATENT DOCUMENTS

| | | | |
|---|---|---|---|
| 2,277,036 A | 3/1942 | Chaussee | |
| 4,745,993 A | * 5/1988 | Schulz et al. | 188/4 B |
| 4,800,992 A | 1/1989 | Andersson et al. | |
| 4,840,399 A | * 6/1989 | Rieger et al. | 188/4 B |
| 4,901,809 A | 2/1990 | Tschannen | |
| 5,080,443 A | 1/1992 | Torneback | |
| 5,785,351 A | * 7/1998 | Chang et al. | 188/4 B |

* cited by examiner

*Primary Examiner*—Jack Lavinder
*Assistant Examiner*—Robert A. Siconolfi
(74) *Attorney, Agent, or Firm*—Angus C. Fox, III (57) ABSTRACT

An mounting system for chain traction systems installable on wheeled vehicles having a beam or live axle. Includes four threaded coupling nuts, each of which is threadably secured to a threaded end of one of the U-bolt shackles which secure the axle to either a set of leaf springs or to an air bag assembly. A cross plate ties each lateral pair of coupling nuts together. A mounting tube bolts to the cross plates, a mounting plate bolts to the mounting tube, and the traction system components bolt to the mounting plate. Elongated bolt holes provide a wide range of adjustability between the bolted-together components for proper positioning of the mounting bracket within an x-y plane. For adjustability in a "z" direction, spacers of varying thickness may be inserted between the coupling nuts and the cross plates. The components may be welded together when properly positioned.

8 Claims, 6 Drawing Sheets

ADJUSTABLE MOUNTING ASSEMBLY FOR A RAPIDLY-DEPLOYABLE ICE CHAIN SYSTEM FOR WHEELED VEHICLES

BACKGROUND OF THE INVENTION

1. Field of the Invention

This invention relates to vehicle ice and chain traction traction systems which may be both rapidly deployed and rapidly retracted. More particularly, it relates to apparatuses for mounting such systems on vehicles.

2. Description of Related Art

Rapidly-deployable chain traction systems, which may be characterized generally as systems which fling short chain or cable segments beneath a road tire, have been known for some 90 years. Such a system is disclosed in U.S. Pat. No. 1,045,609 and in German Pat. No. No. 266,487 to W. H. Putnam for an ANTISKIDDING DEVICE. Throughout the years, various modifications and improvements have been made by numerous inventors. The following list is a representative list of a dozen other U.S. patents issued in this field:

U.S. Pat. No. 1,150,148 for a TRACTION AND ANTI-SKIDDING DEVICE;
U.S. Pat. No. 1,223,070 for an ANTISKIDDING DEVICE FOR VEHICLES;
U.S. Pat. No. 1,374,252 for an ANTISKID DEVICE FOR AUTOMOBILES;
U.S. Pat. No. 1,381,001 for a NON-SKID DEVICE FOR MOTOR AND OTHER VEHICLES;
U.S. Pat. No. 1,975,325 for an ANTISKID CHAIN AND MEANS FOR APPLYING AND REMOVING SAME;
U.S. Pat. No. 2,241,923 for an AUTOMATIC EMERGENCY TRACTION DEVICE FOR AUTOMOBILES;
U.S. Pat. No. 2,264,466 for an ANTISKID DEVICE FOR VEHICLES;
U.S. Pat. No. 2,277,036 for an ANTISKID DEVICE;
U.S. Pat. No. 2,283,948 for an AUTOMOBILE TRACTION DEVICE;
U.S. Pat. No. 2,442,322 for an ANTISKID DEVICE;
U.S. Pat. No. 4,299,310 for an ANTISKID DEVICE FOR MOTOR VEHICLES;
U.S. Pat. No. 4,800,992 for an ANTI-SKID DEVICE; and
U.S. Pat. No. Des. 286,524 for ANTI SKID CHAIN UNIT FOR VEHICLE TIRES.

Figure 1:
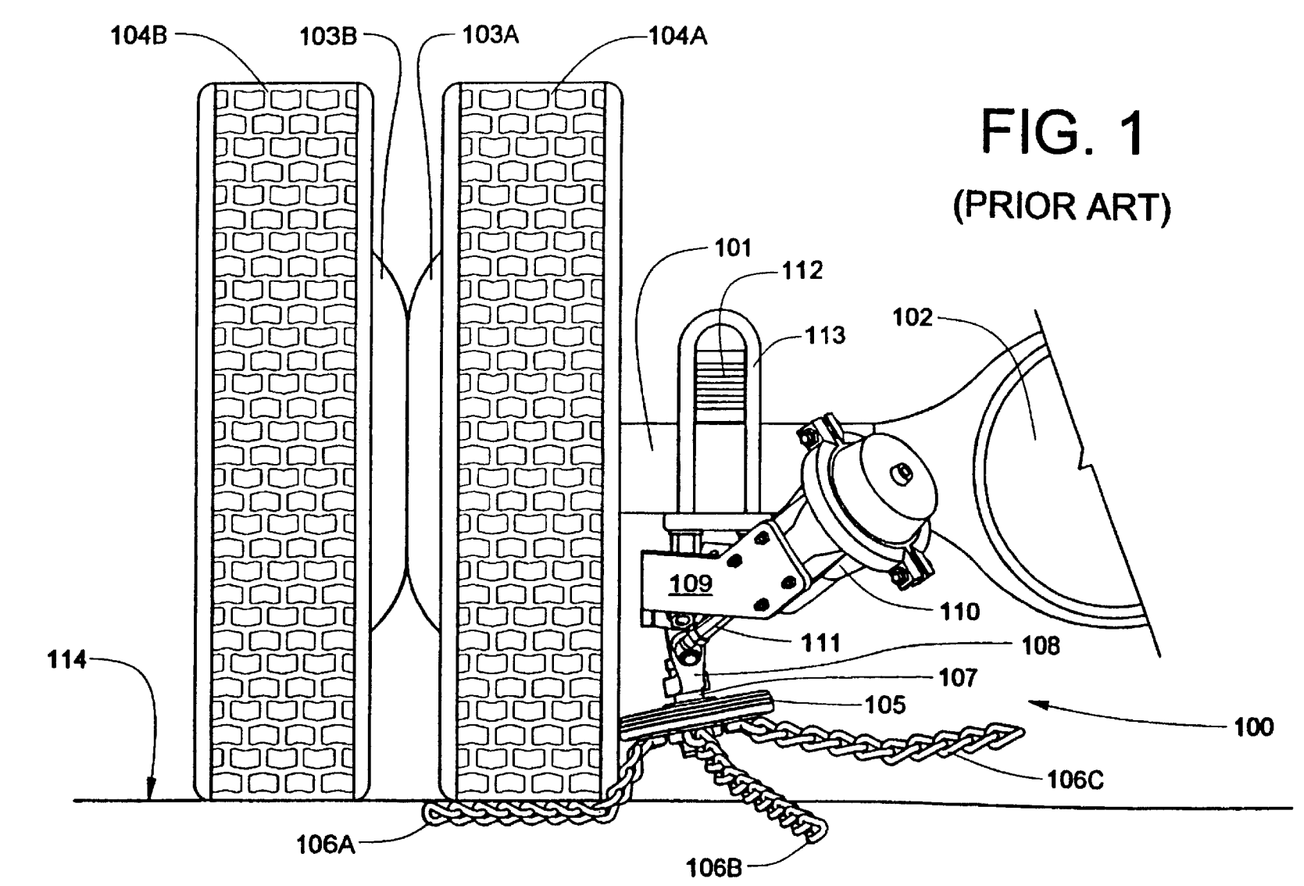
FIG. 1 is a rear elevational view of a typical modern rapidly-deployable chain traction system.

Referring now to the prior-art system of FIG. 1, a modern rapidly-deployable chain traction system 100 is depicted in its deployed configuration in this rear elevational view drawing. The chain traction system 100 is removably affixed to a drive axle 101 which incorporates a differential unit 102. Inner and outer road wheels (103A and 103B, respectively) are mounted on the visible half of the drive axle 101. On each road wheel (103A and 103B) is mounted a rubber tire (104A and 104B, respectively). The chain system 100 includes a friction drive disc 105 to which a plurality of chain segments 106A, 106B and 106C are attached. Chain segment 106A is depicted as being below the road surface 114, which is normally covered with a layer of snow or ice when the chain system 100 is in the deployed configuration. The friction drive disc 105 is rotatably mounted on a spindle 107 which is affixed to a support member 108 which is pivotally mounted to a mounting bracket 109. The mounting bracket is, in turn, bolted to the U-bolt shackles 113 which secure the suspension leaf springs 112 to the drive axle 101.

The chain system 100 also includes a pneumatic cylinder 110 that is bolted to the mounting bracket 109. The pneumatic cylinder 110 has a slidable piston 111 that is held in a normally retracted position within cylinder 110 by spring biasing when pressure within cylinder 108 equals ambient pressure. The outer end of piston 111 is connected to support member 108. In the deployed configuration, the outer rim of friction drive disc 105 is pressed against the sidewall of tire 104A by a biasing force applied to support member 108 by piston 111. The biasing force is provided by pneumatic pressure inside pneumatic cylinder 110 which overcomes the spring biasing and causes piston 111 to extend. As the tire 104A rotates, the friction drive disc 105 also rotates with the chain segments 106 extended more or less radially therefrom. Thus each chain segment 106 is flung, sequentially, beneath the tread portion of tire 104A. In order to retract the system and disengage the friction drive disc 105 from contact with the sidewall of tire 104A, pneumatic pressure to pneumatic cylinder 110 is cut off, causing piston 111 to retract within cylinder 110 and raising the support member 108, the rotatably attached friction drive disc 105 and the attached chain segments 106. In the retracted configuration, the chain segments 106 do not touch the road surface 114.

Typically, the mounting brackets used to attach the rapidly-deployable chain traction system components to the spring shackles must be custom fabricated for each vehicle, as wheel sizes and shackle configurations and suspension geometry dimensions vary from vehicle to vehicle. In U.S. Pat. No. 4,800,992, granted to Olle Andersson and Lennart Carlsson on Jan. 31, 1989, a unique mounting system is disclosed for rapidly-deployable chain traction systems. A cylindrical tube is slidably and rotatably mounted within a pair of clamps attached to the spring shackle bolts. The support member which carries the spindle-mounted drive disc at one end, is pivotally mounted at the other end to a mounting plate which is welded to an end of the cylindrical tube. A large measure of adjustability is provided by this arrangement. During installation, the clamps are maintained in a somewhat loose condition until operational alignment of the traction components is achieved by sliding and rotating the cylindrical tube. When proper alignment is achieved, the clamps are tightened to secure the cylindrical tube in a fixed position. Although this system provides greatly facilitated installation with minimal customization of parts, there are several disadvantages. The first is that the cylindrical tube may rotate with use, even though tightly clamped. The second is that the range of adjustability is not ideal. Though positionable without a change in orientation along the sliding axis, there is no effective height adjustment. If the mounting plate is welded off center from the axis of the cylindrical tube, height of the system may be adjusted by rotating the cylindrical tube. However, off center mounting of the mounting plate increases the torque around the axis of the tube, thereby increasing the tendency of the tube to rotate during use. In addition, adjustment of the height of the system by rotating the tube changes the angular orientation of the components.

What is needed is a new type of mounting system for rapidly-deployable chain traction systems which are simple to adjust, provide for adjustment of the traction components about three axes with no change in angular orientation, and which are relatively impervious to alignment changes during operation.

SUMMARY OF THE INVENTION

The invention is an improved mounting apparatus for chain traction systems installable on wheeled vehicles.

Designed for use on vehicles which have a beam or live axle (i.e., one which incorporates a differential), the apparatus mounts to U-bolt shackles which commonly secure the axle to either a set of leaf springs or an air bag assembly. If no U-bolts are present on the axle, a new set of U-bolts may be installed thereon and used to secure the system. In either case, the new mounting system is designed to be mounted directly to the exposed, threaded ends of the U-bolt shackles.

For each side of the vehicle, the new mounting system includes four threaded coupling nuts, each of which is threadably secured to a threaded end of one of the U-bolt shackles. A cross plate having a pair of outer apertures and a central aperture ties each lateral pair of coupling nuts together. Thus, each side of the vehicle employs two cross plates. One of the apertures of each cross plate is elongated so that the cross plate may accommodate a range of spacing between U-bolt shackles. Bolts are used to attach the cross plates to the coupling nuts. A mounting tube of generally square cross section has four apertures aligned along its length. The first two apertures are round and near one end of the tube. The other two apertures are elongated for adjustably attaching the tube to the central apertures of the two cross plates with bolts and nuts. A mounting plate includes two sets of two holes. The holes of the first set, which are round, are used to attach the chain traction components. The holes of the second set, which are elongated, are used for adjustably securing the mounting plate to the mounting tube.

The mounting bracket of the traction system, which corresponds to the mounting bracket 109 of FIG. 1, has been adapted to mount to the mounting plate. It will be appreciated that the elongated apertures in the mounting plate and in the mounting tube permit a great deal of adjustability of the mounting bracket within an x-y plane. The adjustability permits side-to-side movement, back-and-forth movement, as well as a certain amount of pivotal movement for proper alignment of the components. For adjustability up and down movement in a "z" direction, spacers, such as plain flat washers or rectangular spacers having a central aperture, of varying thickness may be inserted between the coupling nuts and the cross plates. The use of spacers may require the use of longer bolts for securing the cross plates to the coupling nuts.

In order to provide a movement-free installation once proper adjustment of the components has been achieved, the parts may be locked in place using a short weld bead where the various adjustable parts join. For service at a later date, the bead may be ground off to free the parts.

PREFERRED EMBODIMENT OF THE INVENTION

The invention is an improved mounting apparatus for chain traction systems installable on wheeled vehicles. Referring now to both FIG. 1 and FIG. 2, the particular mounting system disclosed herein is designed for use on vehicles which have a beam or live axle (i.e., one which incorporates a differential) 101. On each side of the vehicle, the apparatus mounts to U-bolt shackles which commonly secure the axle to a set of leaf springs 112 or an air bag assembly (not shown). If no U-bolts are present on the axle, a new set of U-bolts may be installed thereon and used to secure the system. In either case, the new mounting system is designed to be mounted directly to the exposed, threaded ends of the U-bolt shackles. coupled to two sets of leaf springs (see 112 of FIG. 1). Each leaf spring set is coupled to the beam axle or axle housing (in the case of a live axle) with a pair of U-bolt shackles113, which are tied together beneath the axle or axle housing with a flat tie plate 114 that is secured with four standard nuts 115 (two on each U-bolt). The new mounting system is designed to be mounted directly to the exposed, threaded ends of the U-bolt shackles 113.

Referring now to FIGS. 2, 3, 4 and 5, for each side of the vehicle, the new mounting system 200 includes four threaded coupling nuts 201, each of which is of sufficient length to engage a threaded shaft or bolt shank at each end thereof. Each of the coupling nuts 201 is threadably secured to a threaded end of one of the U-bolt shackles 113. The mounting system 200 further includes, for each side of the vehicle, a pair of cross plates 301. Each cross plate 301 has a pair of outer apertures 302A and 302B for securing the plate to a pair of coupling nuts 201, and a round central aperture 303. One of the outer apertures 302B is elongated so that the cross plate 301 may accommodate a range of spacing between U-bolt shackles 113. Four coupler bolts 304 are used to anchor the cross plates 301 to the free ends of the coupling nuts 201, which are attached to the U-bolt shackles 113. A tube 305 of generally square cross section has four apertures aligned along its length. The first two apertures 306A and 306B are round and are near one end of the tube 305. The other two apertures 307A and 307B, are elongated for adjustably attaching the tube 305 to the round central apertures 303 of cross plates 301. Attachment bolts 308 and attachment nuts 309 are used to attach the tube 305 to the cross plates 301. A mounting plate 310 includes two sets of holes 311A and 311B. The holes 311A, which are used for mounting the traction system, are round. Mounting bolts 312 and mounting nuts 313 are used for this purpose. The holes 311B, which are used for adjustably securing the mounting plate 310 to the mounting tube 305, are elongated. Securing bolts 314 and securing nuts 315 are used for securing the mounting plate 310 to the mounting tube 305. It will be noted that spacers 316 may be employed to adjust the inclination of the mounting tube 305.

Figure 2:
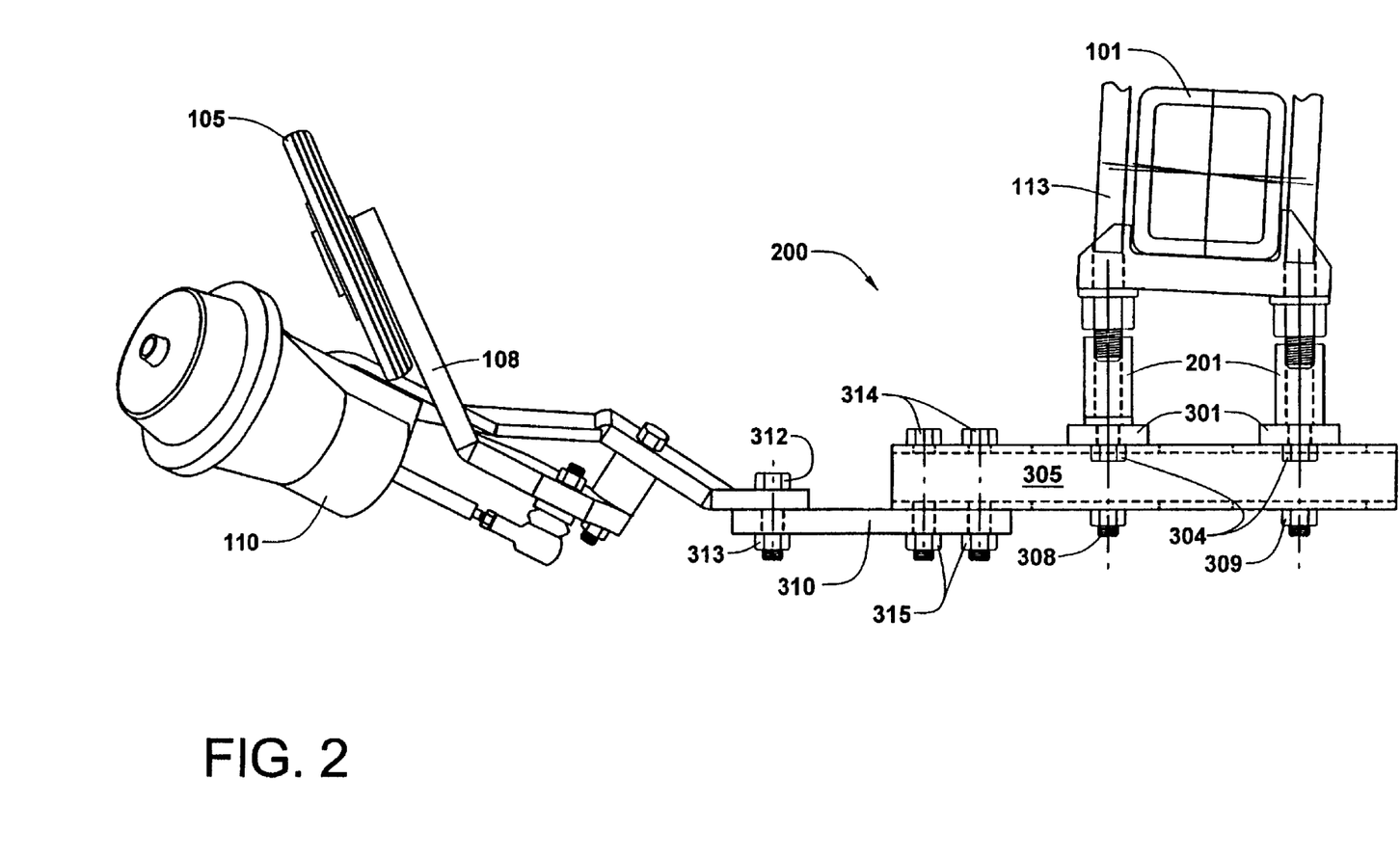
FIG. 2 is a side elevational view of a rapidly-deployable chain traction assembly coupled to a vehicle axle via the new mounting assembly.
Figure 3:
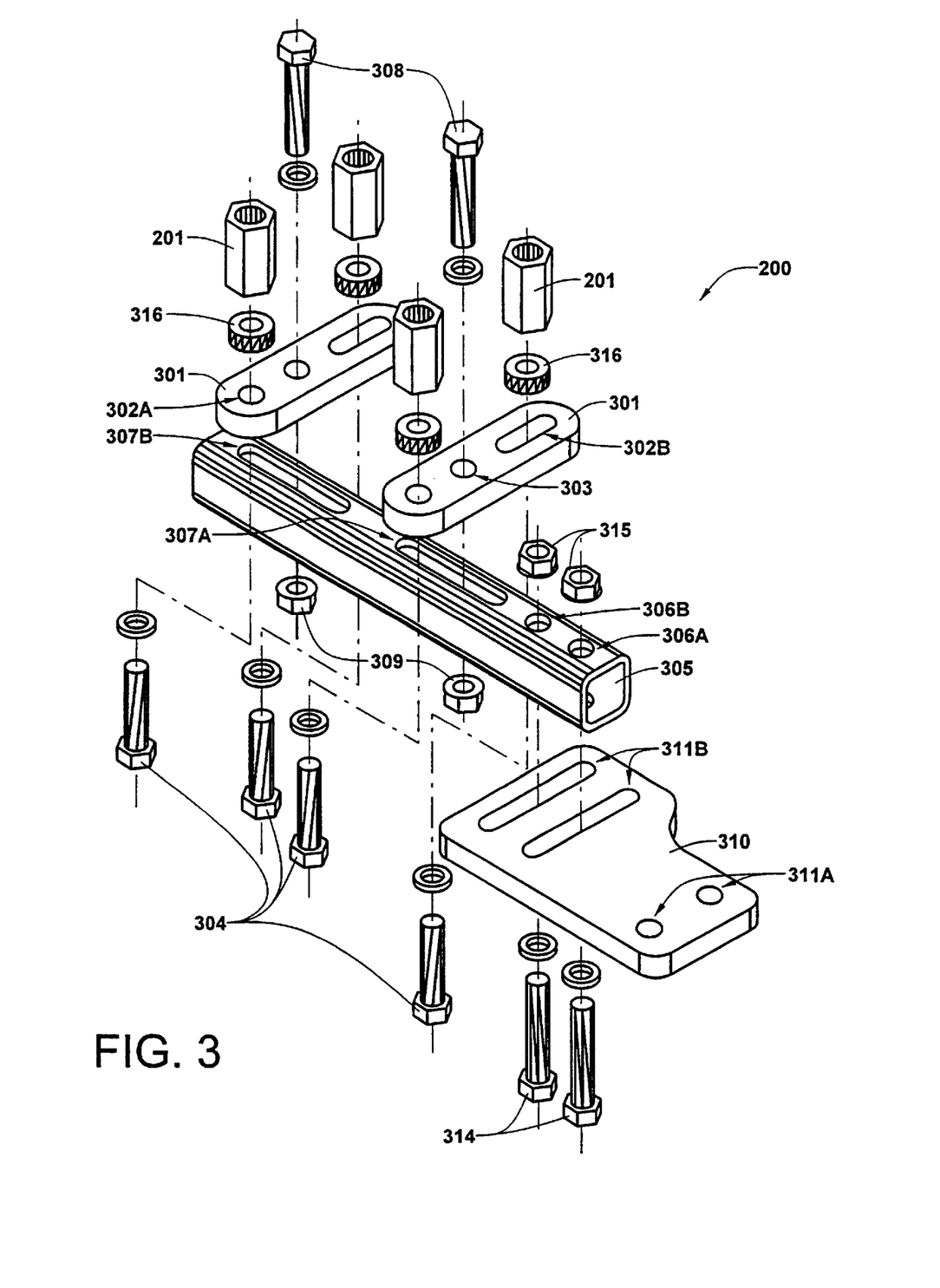
FIG. 3 is an isometric exploded view of the new mounting assembly for a chain traction system.
Figure 6:
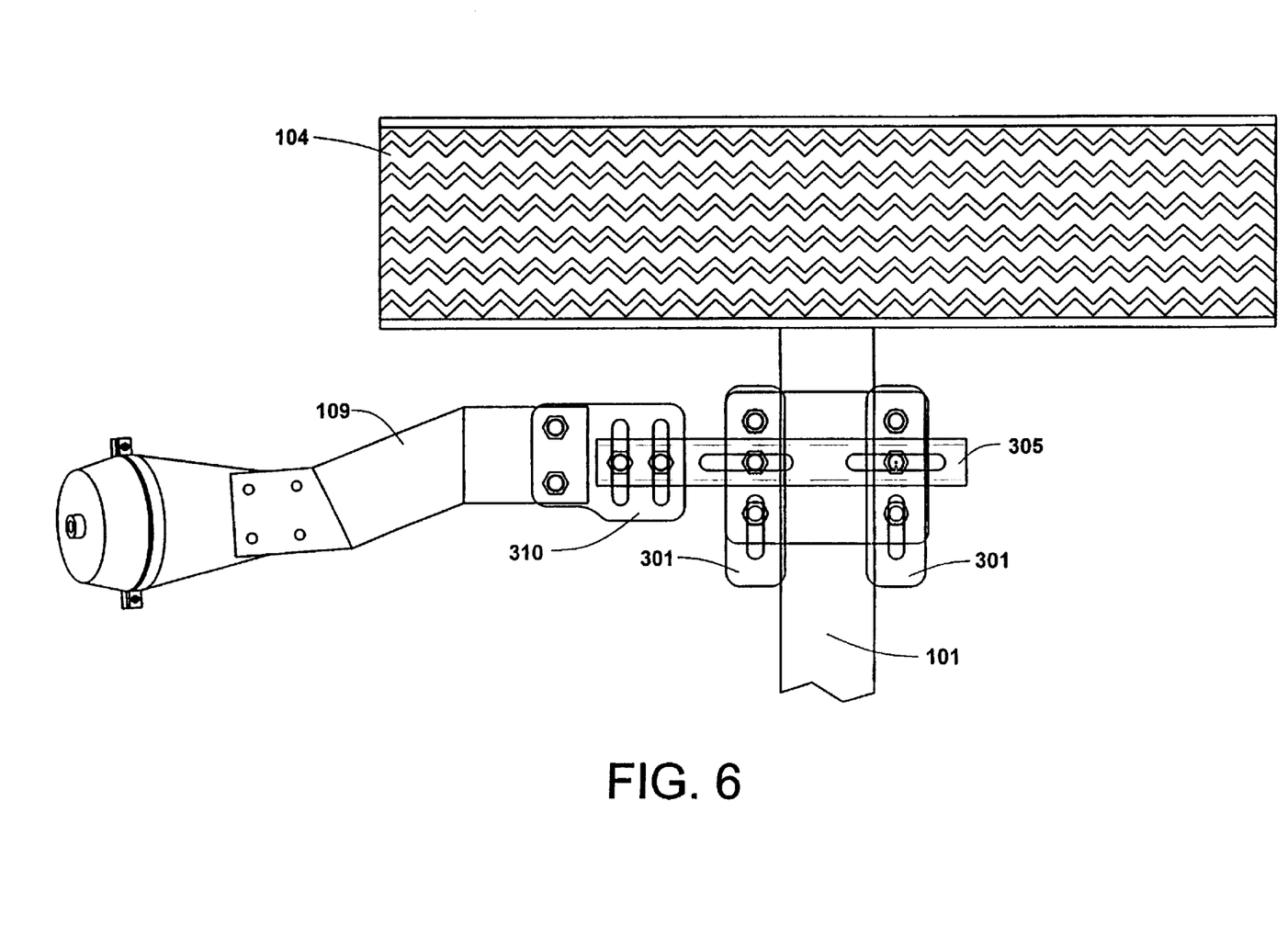
FIG. 6 is a top plan view of a rapidly-deployable chain traction system coupled to a vehicle axle via the new mounting assembly.

Referring now to FIGS. 2 and 6, the mounting bracket 601 of the traction system 600, which corresponds to the mounting bracket 109 of FIG. 1, has been adapted to mount to the mounting plate 310. It will be appreciated that the elongated apertures in the mounting plate 310 and the mounting tube 305 permit a great deal of adjustability of the mounting bracket 601 with an x-y plane. The adjustability permits side-to-side movement, back-and-forth movement, as well as a certain amount of pivotal movement for proper alignment of the components. In order to provide up and down movement in a "z" direction, spacers, such as plain flat washers, of varying thickness may be inserted between the coupling nuts 201 and the cross plates 301. If spacers are used, longer coupler bolts 304 may be required.

Figures 4, 7:
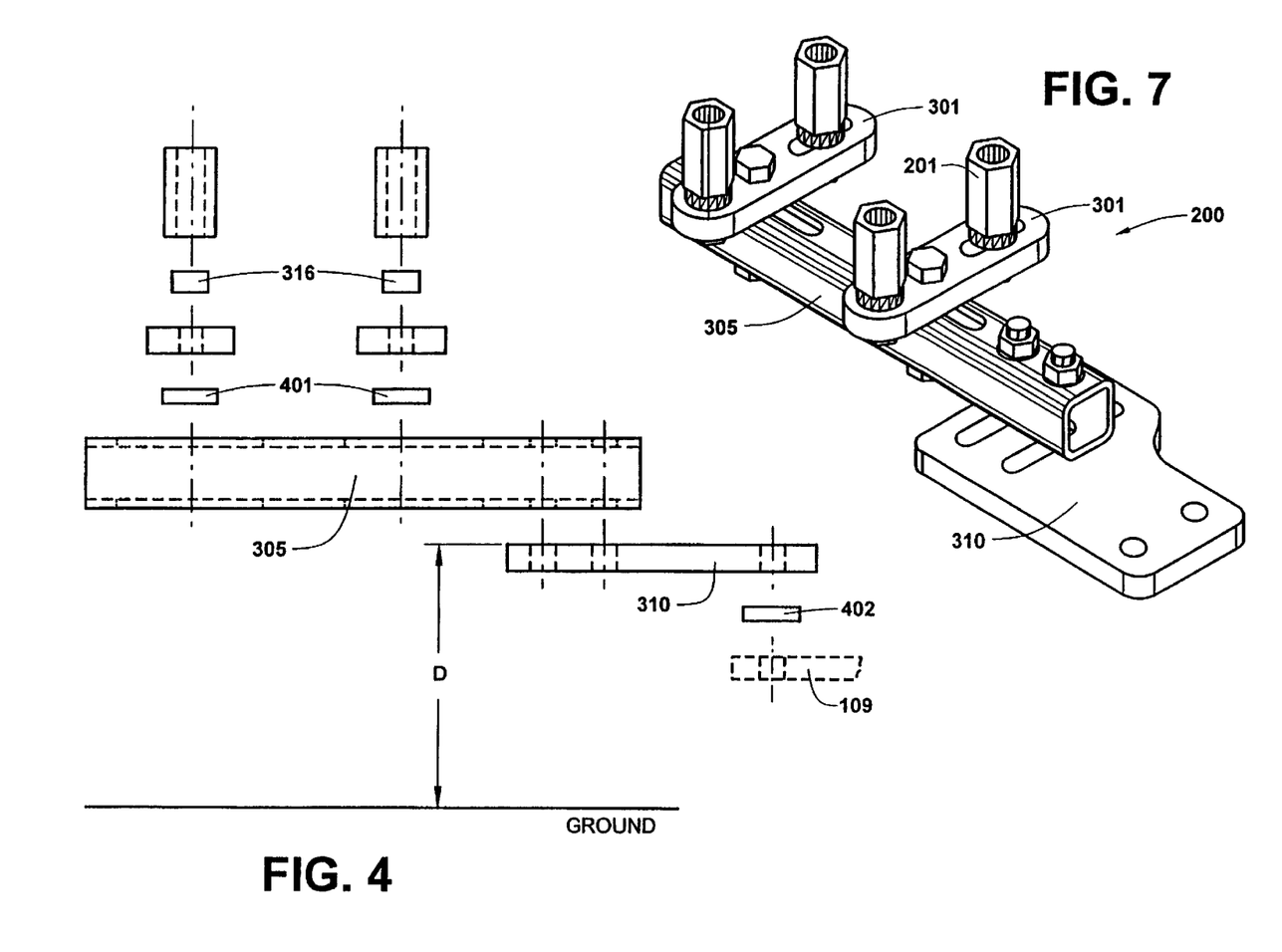
FIG. 4 is a top plan view of the new mounting assembly of FIG. 2.
FIG. 7 is an isometric assembled view of the new mounting assembly.
Figure 5:
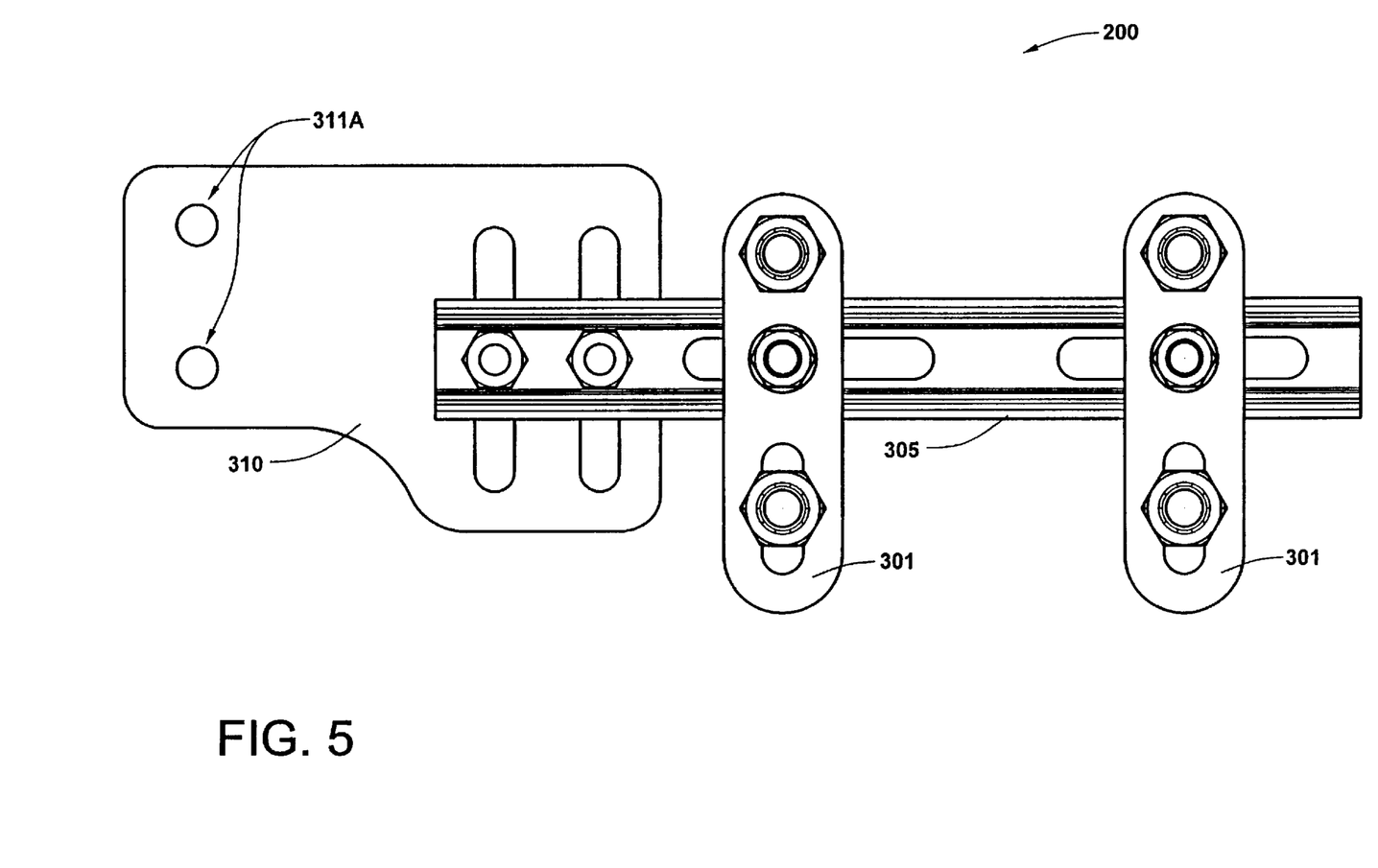
FIG. 5 is a side elevational exploded view of the new mounting assembly of FIG. 2.

FIGS. 7 and 8 provide a more clear view of the actual shape of the mounting plate 310, the mounting tube 305 and the cross plates 301.

In order to provide a movement-free installation once proper adjustment of the components has been achieved, the parts may be locked in place using a short weld bead where the various adjustable parts join. The weld beads serve only a locking function, as the bolts and nuts remain securely tightened. For service at a later date, the bead may be ground off to free the parts.

Although only a single embodiment of the adjustable vehicle mounting apparatus for a rapidly-deployable chain traction system are shown and described herein, it will be obvious to those having ordinary skill in the art that changes and modifications may be made thereto without departing from the scope and the spirit of the invention as hereinafter claimed.

What is claimed is:

1. A chain traction system for mounting beneath a vehicle adjacent a tire (104) mounted on a wheel (103) attached to an axle (101) that is coupled to the vehicle with at least two U-bolts (113), said system comprising:

at least four coupling nuts (201) threadably attached to the ends of the U-bolts (113), said coupling nuts providing z-axis position adjustment for the system;

a pair of cross plates (301), each cross plate coupling together two coupling nuts (201);

a square-tube member (305) having a first set of at least two elongate apertures (307A & 307B) and a first set of at least two additional apertures (306A & 306B), each aperture passing through a pair of opposed sides of said member;

a first set of at least two threaded fasteners (308/309), each of which couples said square-tube member (305) to a cross plate (301), said first set of elongate apertures (307A & 307B) providing x-axis position adjustment for the system;

a mounting plate (310) having a second set of at least two elongate apertures (311B) and a second set of at least two additional apertures ((311A), said second set of elongate apertures providing y-axis position adjustment for the system;

a second set of at least two threaded fasteners (314/315) which couple said mounting plate (310) to said second set of elongate apertures;

a mounting bracket (109);

a third set of at least two threaded fasteners (313/312) which couple said mounting bracket (109) to said second set of additional apertures (311A);

a support member (108) pivotally mounted to said mounting bracket (109);

a friction disk (105) rotatably mounted on said support member (108);

a plurality of equal length chain segments (106) mounted to a periphery of said friction disk;

means for providing a biasing force to said support member (108), said means affixed to said mounting bracket (109), said biasing force moving said support member (108) from a retracted position so as to position the periphery of said friction disk (105) in contact with said tire (104A) so that as the wheel (103A) is rotated, the friction disk will spin, throwing the attached chain segments (106) beneath the tire.

2. The chain traction system of claim 1, wherein said means for providing a biasing force is a pneumatic cylinder (110).

3. The chain traction system of claim 1, wherein rotational positioning of the system in an x-z plane is also provided by spacers (316) in combination with the coupling nuts (201).

4. An adjustable apparatus for mounting a rapidly-deployable vehicle snow chain traction system on a vehicle adjacent a tire (104) mounted on a wheel (103) attached to an axle (101) that is coupled to the vehicle with at least two U-bolts (113), said apparatus comprising:

at least four coupling nuts (201) threadably attached to the ends of the U-bolts (113), said coupling nuts providing z-axis position adjustment for the system;

a pair of cross plates (301), each cross plate coupling together two coupling nuts (201);

a square-tube member (305) having a first set of at least two elongate apertures (307A & 307B) and a first set of at least two additional apertures (306A & 306B), each aperture passing through a pair of opposed sides of said member;

a first set of at least two threaded fasteners (308/309), each of which couples said square-tube member (305) to a cross plate (301), said first set of elongate apertures (307A & 307B) providing x-axis position adjustment for the system;

a mounting plate (310) having a second set of at least two elongate apertures (311B) and a second set of at least two additional apertures ((311A), said second set of elongate apertures providing y-axis position adjustment for the system;

a second set of at least two threaded fasteners (314/315) which couple said mounting plate (310) to said second set of elongate apertures;

a mounting bracket (109);

a third set of at least two threaded fasteners (313/312) which couple said mounting bracket (109) to said second set of additional apertures (311A), said mounting bracket having a support member (108) pivotally mounted thereto, said support member having a friction disk (105) rotatably mounted thereon, said friction disk having a plurality of generally equal length chain segments (106) mounted near the periphery and on an underside thereof.

5. The adjustable apparatus of claim 4, which further comprises a pneumatic cylinder affixed to said mounting bracket, said pneumatic cylinder providing a biasing force to said support member (108), so as to reversably move said support member (108) from a retracted position to a deployed position where the periphery of said friction disk (105) is in contact with a tire of the vehicle.

6. An adjustable apparatus for mounting a rapidly-deployable vehicle snow chain traction system on a vehicle adjacent a tire (104) mounted on a wheel (103) attached to an axle (101) that is coupled to the vehicle with at least two U-bolts (113), said apparatus comprising:

at least four coupling nuts (201) threadably attached to the ends of the U-bolts (113), said coupling nuts providing z-axis position adjustment for the system;

a pair of cross plates (301), each cross plate coupling together two coupling nuts (201);

a first member (305) coupled to said pair of cross plates (301) via a first set of at least two elongate apertures (307A & 307B), which provide x-axis positioning of the traction system; and a second member (310) coupled to said first member via a second set of at least two elongate apertures (311B), which provide y-axis positioning of the traction system, said second member providing a mounting location for the rapidly-deployable snow chain traction system.

7. The adjustable mounting apparatus of claim 6, wherein the rapidly-deployable vehicle snow chain traction system comprises:

a mounting bracket (109) mountable to said second member (310);

a support member (108) pivotally mounted to said mounting bracket (109);

a friction disk (105) rotatably mounted on said support member (108);

a plurality of equal length chain segments (106) mounted to a periphery of said friction disk;

means for providing a biasing force to said support member (108), said means affixed to said mounting bracket (109), said biasing force moving said support member (108) from a retracted position so as to position the periphery of said friction disk (105) in contact with said tire (104A) so that as the wheel (103A) is rotated, the friction disk will spin, throwing the attached chain segments (106) beneath the tire.

8. The adjustable mounting apparatus of claim 5, wherein rotational positioning of the system in an x-z plane is also provided by spacers (316) in combination with the coupling nuts (201).

* * * * *